US 10,322,724 B2

(12) United States Patent
Edren et al.

(10) Patent No.: US 10,322,724 B2
(45) Date of Patent: Jun. 18, 2019

(54) BRAKE FORCE DISTRIBUTION

(71) Applicant: Zoox, Inc., Foster City, CA (US)

(72) Inventors: Johannes Edren, Belmont, CA (US);
Moritz Boecker, Millbrae, CA (US);
Ryan O'Leary Flatland, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/259,163

(22) Filed: Jan. 28, 2019

(65) Prior Publication Data
US 2019/0152482 A1    May 23, 2019

Related U.S. Application Data

(63) Continuation of application No. 15/784,017, filed on Oct. 13, 2017, now Pat. No. 10,189,476.

(51) Int. Cl.
*B60L 7/10*    (2006.01)
*B60W 30/18*    (2012.01)
*B60L 53/00*    (2019.01)
*B60W 30/02*    (2012.01)

(52) U.S. Cl.
CPC ......... *B60W 30/18127* (2013.01); *B60L 7/10* (2013.01); *B60L 53/00* (2019.02); *B60W 30/02* (2013.01)

(58) Field of Classification Search
CPC ............................ B60W 10/192; B60W 30/22; B60W 30/181; B60W 30/18109; B60W 30/18009; B60W 30/18127; B60W 30/04; B60W 10/08
See application file for complete search history.

(56) References Cited

U.S. PATENT DOCUMENTS

| | | | |
|---|---|---|---|
| 6,120,115 A * | 9/2000 | Manabe | B60T 8/00 |
| | | | 303/152 |
| 6,910,747 B2 * | 6/2005 | Tsunehara | B60L 7/22 |
| | | | 303/152 |
| 9,630,522 B2 | 4/2017 | Ketfi-Cherif et al. | |
| 9,975,436 B2 | 5/2018 | White et al. | |

(Continued)

OTHER PUBLICATIONS

Office Action for U.S. Appl. No. 15/784,017, dated Jun. 28, 2018, Edren, "Brake Force Distribution", 8 pages.

*Primary Examiner* — James A Shriver, II
*Assistant Examiner* — James J Triggs
(74) *Attorney, Agent, or Firm* — Lee & Hayes, P.C.

(57) ABSTRACT

Brake force distribution via a combination of mechanical braking and regenerative braking techniques is described. In an example, a brake system of a vehicle can detect a braking action and can cause a first negative force to be distributed across two or more wheel assemblies associated with the vehicle. A control system of the vehicle can send a command to at least a power system of the vehicle to cause the power system to affect a second negative force on a first wheel assembly and a positive force on a second wheel assembly to cause an uneven distribution of brake force between the first wheel assembly and the second wheel assembly. As a result, a combined net braking force is applied to the front wheels—the wheels with the most grip—and a reduced net braking force to is applied to the rear wheels to prevent rear-wheel lock-up.

20 Claims, 6 Drawing Sheets

(56) References Cited

U.S. PATENT DOCUMENTS

| | | | |
|---|---|---|---|
| 2008/0255744 A1* | 10/2008 | Yasui | B60T 8/1755 |
| | | | 701/70 |
| 2009/0018715 A1* | 1/2009 | Kanayama | B60W 10/115 |
| | | | 701/22 |
| 2015/0032333 A1* | 1/2015 | Nakatsu | B60G 17/0195 |
| | | | 701/37 |

* cited by examiner

BRAKE FORCE DISTRIBUTION

RELATED APPLICATION

This Application is a continuation of, and claims priority to U.S. patent application Ser. No. 15/784,017, filed on Oct. 13, 2017, entitled "BRAKE FORCE DISTRIBUTION", which is incorporated in its entirety by reference herein.

BACKGROUND

Brake force distribution varies an amount of force that is applied to the brake at each wheel of a vehicle based on road conditions, speed, loading, etc. Current techniques for vehicles with hydraulically actuated brakes utilize differences in the static sizing of vehicle components (e.g., calipers and rotors associated with a rear wheel assembly are generally smaller than calipers and rotors associated with a front wheel assembly) and pressure reducing valves that are mechanically and/or electronically controlled to facilitate brake force distribution. An example of mechanically controlling brake force distribution can include a brake proportioning valve for a rear wheel assembly that reduces the hydraulic pressure supplied to the rear brakes in comparison to the front brakes. Examples of electronically controlling brake force distribution can include electronic brake force distribution (EBD) systems and/or electronic stability control (ESC) systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
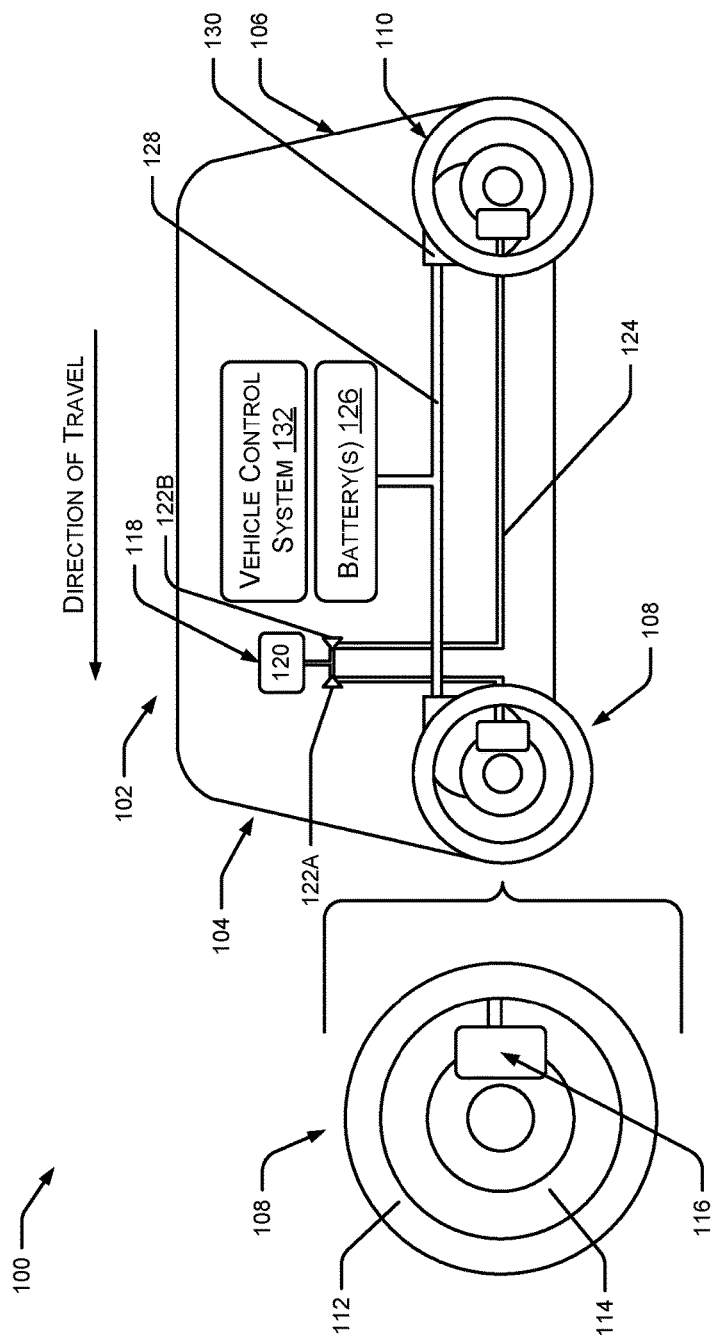
FIG. 1 is a schematic view of an example vehicle as described herein.

Techniques described herein are directed to brake force distribution. In at least one example, techniques described herein are directed to utilizing regenerative braking in combination with mechanical braking to apply different force(s) to different wheel assemblies of a vehicle to vary the distribution of brake forces. For the purpose of this discussion, regenerative braking slows a vehicle by converting the kinetic energy association with motion of the vehicle into electrical energy that can be used immediately or stored for future use (e.g., by charging a battery or capacitor).

In some examples, techniques described herein are directed to brake force distribution in bidirectional vehicles. A bidirectional vehicle is configured to switch between traveling in a first direction and a second, opposite, direction. In other words, there is no fixed "front" or "rear" of the vehicle. Rather, whichever end of the vehicle is leading at the time becomes the "front" and the trailing end becomes the "rear." In bidirectional vehicles, the sizing of vehicle components can be substantially the same on both wheel assemblies. That is, in bidirectional vehicles, there can be substantially symmetric hardware to facilitate the bidirectional functionality of the vehicle. In some examples, unidirectional vehicles can also have substantially symmetric hardware. Accordingly, techniques described herein are directed to utilizing regenerative braking techniques to apply different force(s) to different wheel assemblies of a vehicle to improve braking performance (e.g., to mitigate wheel lock-up and control slip). In some examples, techniques described herein can implement regenerative braking techniques responsive to a particular event, such as a failure of a stability control system (e.g., EBD, ESC, anti-lock brake system (ABS), etc.), a determination of uneven friction surfaces, etc.

As described herein, a vehicle can be associated with various systems. For instance, a vehicle can include a power system for providing power to enable the vehicle to move in at least a first direction via an application of one or more positive forces. For the purpose of this discussion, a positive force is an accelerating force applied in a substantially same direction as a vehicle is travelling. In some examples, as described herein, the power system can be used to apply a negative force as well, e.g. using regenerative braking. For the purpose of this discussion, a negative force is a decelerating force applied in a direction that is substantially opposite to the direction that the vehicle is travelling. Additionally, the vehicle can include a brake system for causing one or more negative forces to be applied via one or more wheel assemblies to cause the vehicle to decrease its acceleration.

As the name implies, a bidirectional vehicle can travel in two directions. As a result, the braking capabilities (e.g., the size of the mechanical brakes) at each corner of a bidirectional vehicle are generally designed to be substantially the same—as opposed to unidirectional vehicles with smaller brakes at the rear of the vehicle, as discussed above. Or, unidirectional vehicles can be designed to have substantially symmetrical hardware. During a failure of an ESC or ABS system on vehicles having substantially symmetrical hardware (e.g., bidirectional or otherwise), therefore, it can be difficult or impossible to apply differential braking forces to safely stop the vehicle because the brakes are substantially the same size and, without ABS or ESC, receive substantially the same hydraulic pressure. This can result in locking of the rear wheels and loss of control, among other things.

In an electric vehicle, regenerative braking can be an effective tool to safely slow a vehicle. Modern motor controllers can closely regulate the deceleration of the motor and provide smooth stops. Motor and battery sizing, among other things, limits the amount of regenerative braking that can be provided. The batteries can only take a charge from the motor at a finite rate and can only do so until the battery is fully charged. As a result, there are times when regenerative braking is insufficient (e.g., during emergency braking, or "panic stops") and/or unavailable (e.g., the battery is fully charged, too cool to accept charge, or too hot to accept charge).

To this end, examples of the present disclosure can include techniques for providing blended mechanical and regenerative braking to decrease stopping distances and reduce or eliminate wheel lock. In the situation where the hydraulic pressure to the mechanical brakes cannot be regulated (e.g., during an ABS fault), for example, a braking force can be applied to all four wheels by the mechanical brakes. That is, the braking force can be distributed across all four wheels of the vehicle. At the same time, a negative regenerative braking force can be applied to the front wheels by one or more front drive motors, while a positive force can be applied to the rear wheels by one or more rear drive motors. The net result is a large, combined net braking force on the front wheels—the wheels with the most grip—and a reduced net braking force to the rear wheels to prevent lock-up. In some examples, the system can even be used when the batteries are fully charged—when regenerative braking would normally not be available—because energy generated by the regenerative braking in the front of the vehicle can be offset by using the same amount of energy (minus any losses) to generate the positive force at the rear of the vehicle.

The disclosure is described in the context of bidirectional vehicles. However, it should be noted, that the techniques described herein are not limited to bidirectional vehicles. In some examples, brake force distribution enabled by techniques described herein can also be utilized by unidirectional vehicles. Additionally, techniques described herein are not limited to four-wheeled vehicles, but are merely described in the context of four-wheeled vehicles for ease of explanation. In some examples, brake force distribution enabled by techniques described herein can be utilized by two-wheeled vehicles, four-wheeled vehicles, or, indeed, any ground-borne vehicles (e.g., tractor-trailers, trains, etc.).

Techniques described herein provide various improvements to conventional technologies. For instance, techniques described herein offer redundancy in the event of a malfunctioning stability control system. That is, in the event a stability control system malfunctions, techniques described herein can enable a vehicle to decelerate without wheel lock-up during the deceleration. This provides redundancy that has not been available from previous systems, and can be done without the addition of new hardware. Furthermore, techniques described herein do not rely upon a state of a battery of a vehicle, like conventional regenerative braking techniques, which cannot be utilized when the battery is fully charged or otherwise cannot receive energy. Instead, techniques described herein can transfer energy to alternate sources (e.g., capacitor, flywheel, resistor, heating element, rear wheel assembly, etc.), making techniques described herein more available than conventional regenerative braking techniques.

FIG. 1 is a schematic view 100 of an example vehicle 102 employing brake force distribution techniques described herein. For illustrative purposes, the vehicle 102 is a bidirectional vehicle. As described above, a bidirectional vehicle is configured to switch between traveling in a first direction and a second, opposite, direction. In other words, there is no fixed "front" or "rear" of the vehicle 102. Rather, whichever end of the vehicle 102 is leading at the time, relative to the direction the vehicle 102 is travelling, becomes the "front" and the trailing end becomes the "rear." In FIG. 1, the front 104 of the vehicle 102 is leading, in view of the direction of travel, and the rear 106 of the vehicle 102 is trailing.

The vehicle 102 can include at least two wheel assemblies, a front wheel assembly 108 and a rear wheel assembly 110. In some examples, each corner of the vehicle 102 can be associated with a wheel assembly. Each wheel assembly can include a plurality of components. The front wheel assembly 108 is enlarged to illustrate the various components. For instance, the front wheel assembly 108 can include a wheel 112, which can be associated with a rim and tire, that can be associated with a hub 114 for mounting the wheel 112 to a suspension system of the vehicle 102. Additionally, the front wheel assembly 108 can also include a brake assembly 116. The brake assembly 116 can be controlled by a brake system 118. The components of the front wheel assembly 108 are shown in a simplified format for illustrative purposes and should not limited to such a format. The rear wheel assembly 110 can include the substantially same components in a similar configuration.

As described above, the vehicle 102 can have multiple systems. For example, the vehicle 102 can include the brake system 118. The brake system 118 can apply a clamping force to a brake rotor or drum associated with a brake assembly 116 to cause the vehicle 102 to decelerate. The brake system 118 can include a main brake actuator 120, one or more brake pressure control valves 122A and 122B, one or more brake lines 124, and the brake assembly(s) 116 (which can include caliper(s), rotor(s), pad(s), etc.). The brake system 118 can be hydraulic or electric. Additionally, the vehicle 102 can include a power system, which can include one or more batteries 126, one or more electric busses 128, and one or more drive motors 130. The power system can route power from one or more batteries 126 to a transmission of the vehicle 102 (not pictured) or can send power directly to drive motor(s) 130 proximate the wheel assemblies (e.g., front wheel assembly 108 and rear wheel assembly 110) or at each wheel 112 to cause the vehicle 102 to accelerate. In some examples, the power system can utilize individual components of the power system to affect negative force(s) on individual wheel(s) 112 of the vehicle 102 (e.g., via regenerative braking techniques). The vehicle 102 can also include a vehicle control system 132, which can send one or more commands to other system(s) of the vehicle 102, as described below. Additional details regarding these, and other, systems are described below with reference to FIG. 3.

Figure 2:
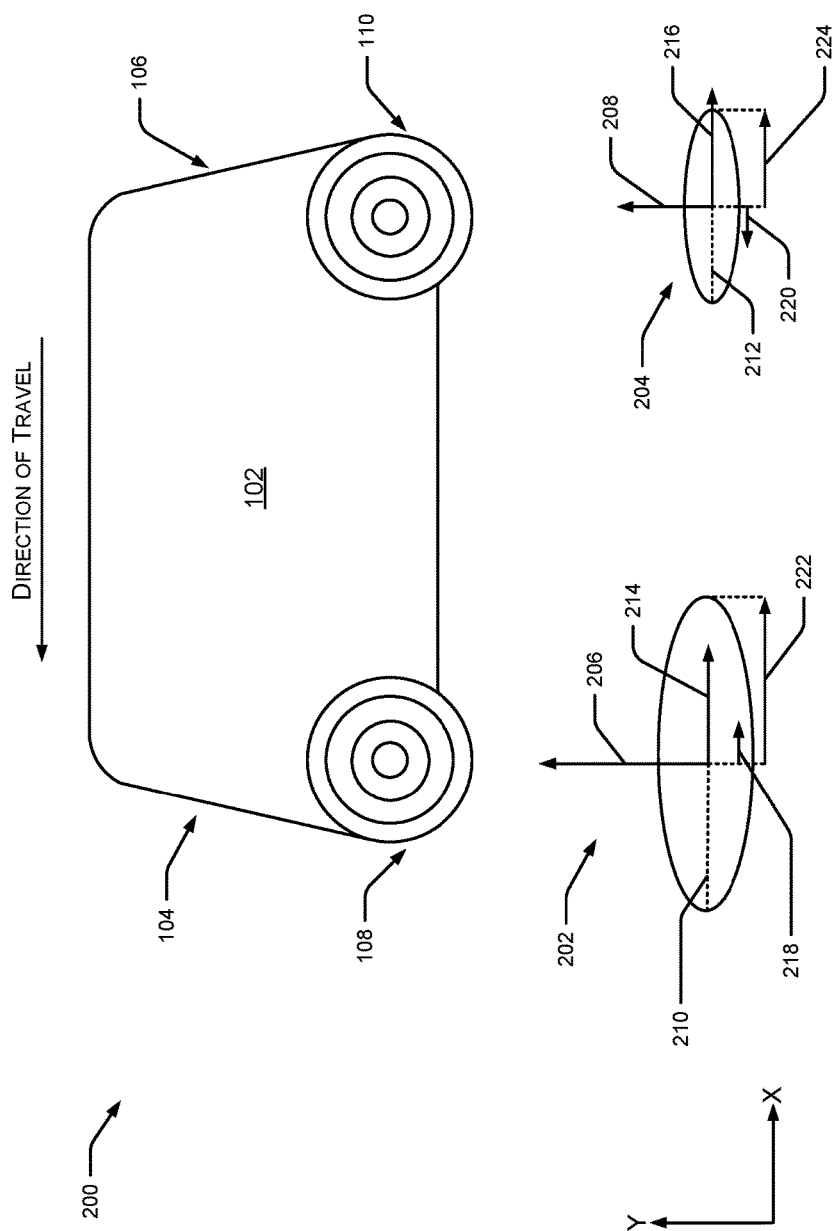
FIG. 2 is a schematic diagram illustrating an example of force(s) being applied to wheel assemblies of a vehicle based on brake force distribution techniques described herein.

FIG. 2 is a schematic diagram 200 illustrating an example of force(s) being applied to wheel assemblies of a vehicle based on brake force distribution techniques described herein. The vehicle 102, as described above with reference to FIG. 1, is illustrated in FIG. 2, travelling in a same direction of travel.

FIG. 2 depicts a first friction circle 202 and a second friction circle 204. A friction circle (also known as a circle of forces, traction circle, friction ellipse, etc.) can graphically represent traction capacity associated with a wheel of a vehicle. As can be understood in the context of this disclosure, a friction "circle" can be represented as an ellipse to represent frictional forces, for example, in a direction of travel (e.g., in the x-direction) and in a direction perpendicular to the direction of travel (e.g., in the y-direction). Accordingly, the friction circle (e.g., represented as an ellipse) can be represented by a semi-major axis and a semi-minor axis. In at least one example, friction information (e.g., that can be used to determine friction circle(s)) can be stored on the vehicle 102 and/or otherwise accessible over a network. In at least one example, techniques described herein can leverage a signal, which can be associated with a pose of a vehicle 102, to determine (e.g., via a lookup) friction information corresponding to the surface for each of the wheels in the vehicle 102.

The first friction circle 202 can correspond to the front wheel assembly 108 and the second friction circle 204 can correspond to the rear wheel assembly 110. As brake force is applied via the brake system 118 of the vehicle 102, the weight of the vehicle 102 shifts forward. Arrows 206 and 208 represent the wheel assembly loads in each friction circle 202 and 204, respectively. In view of the direction of travel, the wheel assembly load on the front wheel assembly 108 has a larger magnitude than the wheel assembly load on the rear wheel assembly 110, as shown by arrow 206 being longer than arrow 208.

The radii of the friction circles can indicate the friction force(s), or "grip," available for each wheel (e.g., a front wheel associated with the front wheel assembly 108 and a rear wheel associated with the rear wheel assembly 110). The diameter (and thus radius) of a friction circle can be determined based on various factors, including the design of the respective wheel, the condition of the wheel (e.g., age, wear, etc.), the road surface, the wheel assembly load on the wheel, etc. As illustrated in FIG. 2, the radius 210 of the first friction circle 202 is greater than the radius 212 of the second friction circle 204. Accordingly, the front wheel has more friction force available due to the increased load on the front wheels caused by the aforementioned weight shift resulting from the braking.

As described above, in bidirectional vehicles (or unidirectional vehicles that are so designed), the sizing of vehicle components can be substantially the same for both (or all) wheel assemblies (e.g., the front wheel assembly 108 and the rear wheel assembly 110). That is, in bidirectional vehicles, there can be hardware symmetry (at least in terms of performance) to facilitate the bidirectional functionality of the vehicle 102. Accordingly, responsive to a braking action, in at least one example, an equal amount of negative force can be applied at the front wheel assembly 108 and the rear wheel assembly 110, as shown by arrows 214 and 216, which are of equal length. For the purpose of this discussion, a negative force can be a decelerating force applied in an opposite direction as the direction of travel. Accordingly, the brake system 118 described above can apply negative forces of equal magnitude to each of the wheel assemblies (e.g., the front wheel assembly 108 and the rear wheel assembly 110). As illustrated, the negative force associated with arrow 216 applied at the rear wheel assembly 110 exceeds the bounds of the friction circle 204. In such an example, this negative force (e.g., associated with arrow 216) would cause wheel lock-up in the rear wheel. In alternative examples, the negative forces applied at the front wheel assembly 108 and the rear wheel assembly 110 can be unequal and in at least one example, the negative force applied to the rear wheel assembly 110 can be such that it still exceeds the bounds of the friction circle 204.

In at least one example, techniques described herein, as described above, are directed to utilizing regenerative braking techniques to apply force(s) to different wheel assemblies of a bidirectional vehicle to mitigate wheel lock-up. For instance, in at least one example, the vehicle control system 132 of the vehicle 102 can send an instruction to the brake system 118 and/or the power system to affect an additional negative force on the front wheel (via the front wheel assembly 108) and, to utilize at least some of the electrical energy resulting from braking, to affect an equal, but opposite (positive) force on the rear wheel (via the rear wheel assembly 110). That is, the power system can leverage regenerative braking to add an additional negative force 218 (i.e., in addition to a negative force applied by the mechanical brakes) to the front wheel and a positive force 220 to the rear wheel that is approximately equal in magnitude to the additional negative force 218. In this manner, the braking force applied at the front wheel assembly 108 via the mechanical brakes (e.g., via the brake system 118) is supplemented with regenerative braking from the drive motors 122 (e.g., via the power system), described above, and the braking force applied at the rear wheel assembly 110 by the mechanical brakes (e.g., via the brake system 118) is reduced by a positive force from the drive motors 122 (e.g., via the power system).

This relationship can be shown in Equations 1-3:

$$F_{FW} = F_{MECH} + F_{REGEN} \quad (1)$$

$$F_{RW} = F_{MECH} - F_{REGEN} \quad (2)$$

$$F_{FW} > F_{RW} \quad (3)$$

In Equations 1-3, $F_{FW}$ is the total amount of braking force applied to a front wheel, $F_{RW}$ is the total amount of braking force applied to a rear wheel, $F_{MECH}$ is the amount of force applied by the brake system 118, and $F_{REGEN}$ is the amount of force applied by the power system. Further, as illustrated in the example of FIG. 2, such asymmetry in the forces applied can be optimized to match the different friction circles 202 and 204 of the front and rear wheels, respectively. As such, the braking force for the vehicle 102 is optimized (e.g., maximized) to bring the vehicle 102 to a stop in the quickest time possible without wheel-lock up.

As a result of supplementing mechanical braking with regenerative braking, the brake force distribution between the front wheel assembly 108 and the rear wheel assembly 110 can be apportioned such that the total amount of braking force applied to the front wheel is greater than the total amount of braking force applied to the rear wheel. Arrow 222, which represents the total amount of braking force applied to the front wheel, is longer than arrow 224, which represents the total amount of braking force applied to the rear wheel. Furthermore, with the positive force (represented by arrow 220), the magnitude of the total braking force (represented by arrow 224) applied at the rear wheel assembly 110 can be less than or equal to the available friction force of the rear wheel. Accordingly, responsive to a braking action, the rear wheel can continue to roll (e.g., maintain a rotational velocity) and rear-wheel lock-up can be prevented.

Although described above, and illustrated in FIG. 2, in terms of applying a decelerating force at one wheel and an accelerating force at the other, other examples can be contemplated. As non-limiting examples, such an asymmetry may be created by, for instance, applying the same braking force to both wheels while either applying a decelerating force or an accelerating force to one of the wheels. In such examples, the system may still optimize the relative forces with regards to the friction circles 202, 204.

FIG. 2 illustrates but one implementation of the techniques described herein. In additional and/or alternative examples, regenerative braking techniques can be leveraged to distribute brake forces for various reasons. For instance, in at least one example, brake forces can be distributed to adjust for uneven friction surfaces. Furthermore, the friction circles 202 and 204 are simplified for the ease of discussion. In some examples, additional and/or alternative forces can also be affecting the distribution of forces in the friction circles 202 and/or 204.

It should be noted that while FIG. 2 is described with respect to applying different forces to front wheel(s) and rear wheel(s), in some examples, techniques described herein can be utilized to vary brake forces between left wheel(s) and right wheel(s) and/or wheels that are diagonally positioned. That is, in some examples, the power system can affect a negative force on a wheel on a left side of the vehicle 102 and an equal, but opposite (positive) force on a wheel on a right side of the vehicle 102. In some examples, the left wheel and the right wheel can be positioned on a same end of the vehicle 102 (e.g., the front or rear) or on different ends of the vehicle 102. In some examples, such brake force distribution can be implemented in vehicles having multi-wheel independent braking capabilities (e.g., having hub motors).

Figure 3:
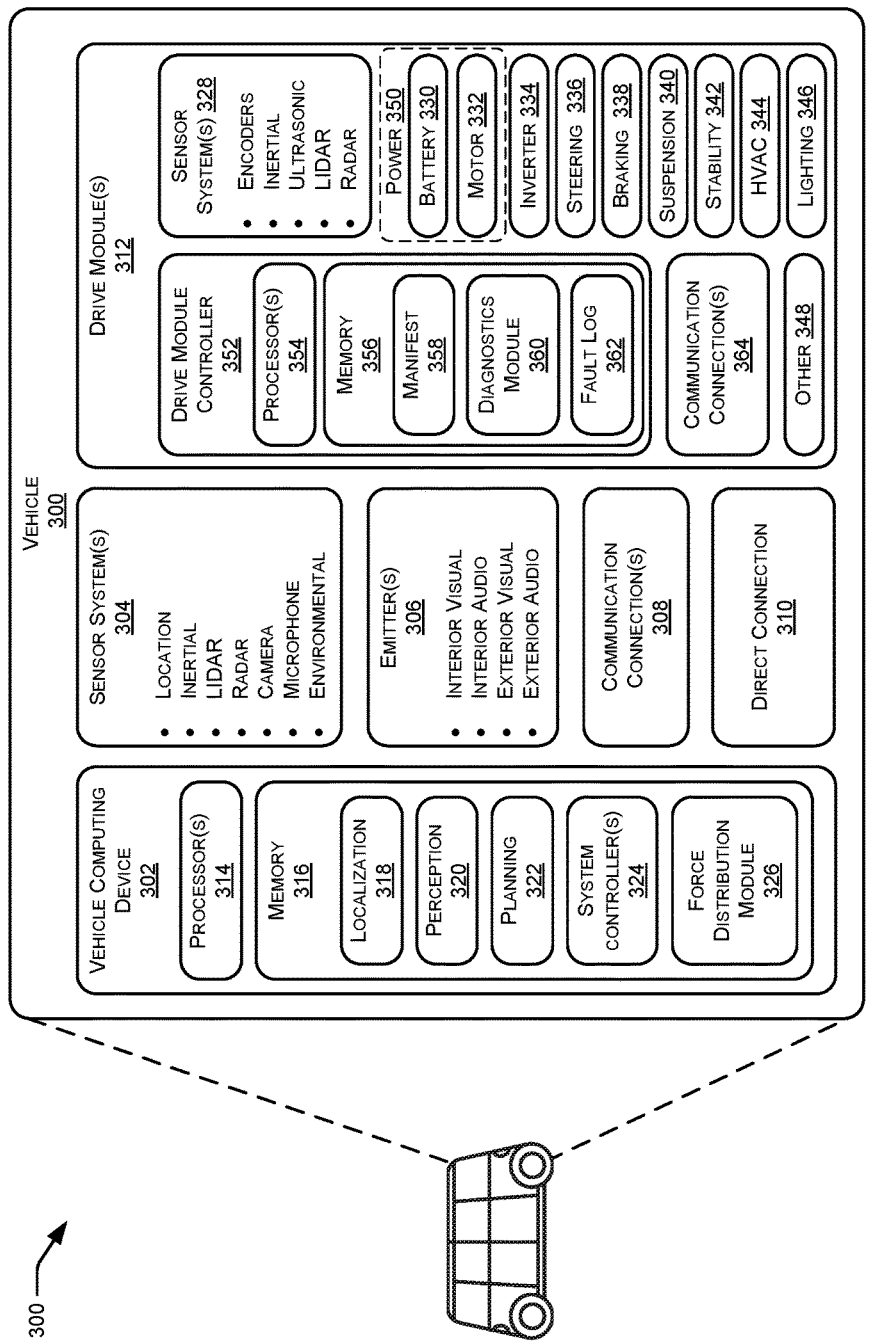
FIG. 3 is a block diagram illustrating an example computing architecture of a vehicle as described herein.

FIG. 3 is a block diagram illustrating an example computing architecture of a vehicle 300 as described herein. In at least one example, the vehicle 300 can be the same vehicle as the vehicle 102 described above with reference to FIG. 1.

The vehicle 300 can include a vehicle computing device 302, one or more sensor systems 304, one or more emitters 306, one or more communication connections 308, at least one direct connection 310, and one or more drive modules 312.

The vehicle computing device 302 can include one or more processors 314 and memory 316 communicatively coupled with the one or more processors 314. In the illustrated example, the vehicle 300 is an autonomous vehicle, however, the vehicle 300 could be any other type of vehicle. In the illustrated example, the memory 316 of the vehicle computing device 302 stores a localization system 318 to determine where the vehicle 300 is in relation to a local and/or global map, a perception system 320 to perform object detection, segmentation, and/or classification, and a planner system 322 to determine routes and/or trajectories to use to control the vehicle 300. Additional details of localizer systems, perception systems, and planner systems that are usable can be found in U.S. patent application Ser. No. 14/932,963, filed Nov. 4, 2015, entitled "Adaptive Mapping to Navigate Autonomous Vehicle Responsive to Physical Environment Changes," and Ser. No. 15/632,208, filed Jun. 23, 2017, entitled "Trajectory Generation and Execution Architecture," both of which are incorporated herein by reference. In an example where the vehicle 300 is not an autonomous vehicle, such components can be omitted from the vehicle 300.

In at least one example, the vehicle computing device 302 can include one or more system controllers 324, which can be configured to control steering, propulsion, braking, safety, emitters, communication, and other systems of the vehicle 300. These system controller(s) 324 can communicate with and/or control corresponding systems of the drive module(s) 312 and/or other components of the vehicle 300. In at least one example, the vehicle control system 132 described above with reference to FIG. 1 can correspond to the system controller(s) 324.

Furthermore, the vehicle computing device 302 can include a force distribution module 326. The force distribution module 326 can determine when to apply different force(s) to different wheels (e.g., via different wheel assemblies) of the vehicle 300 to vary the distribution of brake forces. In some examples, the force distribution module 326 can utilize regenerative braking techniques to affect a negative force on a first wheel assembly and a positive force on a second wheel assembly (e.g., as described above with reference to FIG. 1). As described below, in some examples where regenerative braking techniques are employed, the positive force can be equal to the negative force or unequal to the negative force (e.g., in examples where some of the electrical energy is deposited into the battery or another component). In additional and/or alternative examples, the force distribution module 326 can send an instruction to a power system of the vehicle 300 to instruct the power system to affect a positive force (e.g., an accelerating force) on one or more wheel assemblies. In some examples, a combination of regenerative braking and acceleration techniques can be utilized by the force distribution module 326 to affect different force(s) on different wheels of the vehicle 300 to vary the distribution of brake forces. In at least one example, the force distribution module 326 can distribute brake forces at any time. In additional and/or alternative examples, the force distribution module 326 can distribute brake forces responsive to determining an occurrence of an event.

In at least one example, the force distribution module 326 can determine an occurrence of an event. As described above, brake force distribution techniques can be implemented responsive to a particular event, such as a braking action, failure of a stability control system, a determination of uneven friction surfaces, etc. In some examples, the force distribution module 326 can receive information from one or more vehicle components (e.g., a drive module controller, described below) and can determine braking action. Responsive to receiving the indication from the drive module controller, the force distribution module 326 can determine an occurrence of an event. In additional and/or alternative examples, the force distribution module 326 can receive information from one or more vehicle components (e.g., a drive module controller, described below) and can determine a failure of a stability control system. For instance, in such examples, a drive module controller, described below, can send an indication of a fault associated with a stability control system to the force distribution module 326. Responsive to receiving the indication from the drive module controller, the force distribution module 326 can determine an occurrence of an event.

In an additional and/or alternative example, the force distribution module 326 can access data associated with wheel speeds of individual wheels of the vehicle 300. Based on the data associated with the wheel speeds, the force distribution module 326 can calculate a relative slip of each of the wheels. Leveraging the determined slip of individual of the wheels, the force distribution module 326 can determine variations of friction with respect to the surface on which the vehicle 300 is driving. That is, in some examples, a first wheel can be associated with a first wheel speed that is greater than a second wheel speed associated with a second wheel. In such examples, the first wheel can be on a surface having less friction (e.g., a lower friction coefficient) than a surface that the second wheel is on. Additionally and/or alternatively, individual wheels can have different wear, pressure, etc. which can cause the first wheel to be associated with the first wheel speed that is greater than the second wheel speed associated with the second wheel. Based at least in part on determining a variation in friction with respect to the surface on which the vehicle 300 is driving, or some other uneven distribution of friction, the force distribution module 326 can determine an occurrence of an event. In at least one example, the force distribution module 326 can refrain from determining an occurrence of an event until a difference between two or more friction coefficients is greater than a threshold. In such an example, responsive to the difference in friction between two or more surfaces meeting or exceeding a threshold, the force distribution module 326 can determine an occurrence of an event.

In some examples, the force distribution module 326 may receive a signal from the localization system 318 indicating a position and/or orientation of the vehicle 300. In such an example, the signal may also comprise, or be used to lookup, friction information corresponding to the surface for each of the wheels in the vehicle 300 (e.g., which can be used to determine a friction circle, etc.). Such information may be available from a local map stored on the vehicle 300, or otherwise accessible over a network. Differences in friction values may be associated with an occurrence of an event.

Furthermore, in some examples, the force distribution module 326 can receive an instruction (e.g., responsive to input from a computing device, a driver, a passenger, a remote operator, etc.) indicating an occurrence of an event.

The force distribution module 326 can send an indication to the system controller(s) 324 of the event, which can send command(s) to one or more system(s) of the drive module(s) 312. In at least one example, the force distribution module 326 can provide an indication of how force(s) are to be distributed between different wheel assemblies of the vehicle 300 to vary the distribution of brake forces. That is, in at least one example, the force distribution module 326 can determine a magnitude and/or direction of force to be applied at each wheel assembly of the vehicle 300 and can provide an indication of such to the system controller(s) 324.

In at least one example, the sensor system(s) 304 can include light detection and ranging (LIDAR) sensors, radio detection and ranging (RADAR) sensors, sound navigation and ranging (SONAR) sensors, location sensors (e.g., global positioning system (GPS), compass, etc.), inertial sensors (e.g., inertial measurement units, accelerometers, gyroscopes, etc.), cameras (e.g., RGB, IR, intensity, depth, etc.), microphones, environment sensors (e.g., temperature sensors, humidity sensors, light sensors, pressure sensors, etc.), etc. The sensor system(s) 304 can include multiple instances of each of these or other types of sensors. For instance, the LIDAR sensors can include individual LIDAR sensors located at the corners, front, back, sides, and/or top of the vehicle 300. As another example, the camera sensors can include multiple cameras disposed at various locations about the exterior and/or interior of the vehicle 300. The sensor system(s) 304 can provide input to the vehicle computing device 302.

The vehicle 300 can also include one or more emitters 306 for emitting light and/or sound, as described above. The emitters 306 in this example include interior audio and visual emitters to communicate with passengers of the vehicle 300. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 306 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles.

The vehicle 300 can also include one or more communication connection(s) 308 that enable communication between the vehicle 300 and one or more other local or remote computing devices. For instance, the communication connection(s) 308 can facilitate communication with other local computing devices on the vehicle 300 and/or the drive module(s) 312. Also, the communication connection(s) 308 can allow the vehicle to communicate with other nearby computing devices (e.g., other nearby vehicles, traffic signals, etc.). The communications connection(s) 308 also enable the vehicle 300 to communicate with a remote teleoperations computing device or other remote services.

The communications connection(s) 308 can include physical and/or logical interfaces for connecting the vehicle computing device 302 to another computing device or a network. For example, the communications connection(s) 308 can enable Wi-Fi-based communication such as via frequencies defined by the IEEE 802.11 standards, short range wireless frequencies such as Bluetooth®, or any suitable wired or wireless communications protocol that enables the respective computing device to interface with the other computing devices.

In at least one example, electrical, fluid, and/or air connections can be provided between the drive module(s) 312 and other components of the vehicle 300. This can be accomplished via a bypass or direct connection 310 in the vehicle 300 that directly connects the drive module(s) 312 and other components of the vehicle. For example, if the vehicle 300 includes multiple drive modules 312 and a hydraulic brake system, the hydraulic brake system of the first drive module can be in direct fluidic communication with a hydraulic brake system of the second drive module via direct connection 310 in order to balance the pressure in the brake systems of both drive module(s) 312. As another example, compressed air from a compressed air system of the first drive module can be directly connected to a compressed air system of the second drive module to balance air pressure of an air suspension system of one or both drive module(s) 312. As yet another example, the direct connection 310 can provide a high voltage link between the batteries of two drive module(s) 312 in order operate the vehicle 300 off the batteries of both drive module(s) 312 to maintain voltage equilibrium between the batteries. While not shown, a switch or valve can be disposed in the direct connection 310 in order selectively close one or more of the direct electrical, fluid, and/or air connections between the drive module(s) 312.

In at least one example, the vehicle 300 can include one or more drive modules 312. In some examples, the vehicle 300 can have a single drive module 312. In other examples, the vehicle 300 can have multiple drive modules 312, which can be identical or different (e.g., one drive module can have a subset of the features of the other drive module, or the drive modules can have one or more distinct or mutually exclusive vehicle systems). In an example where the multiple drive modules 312 are identical (or substantially identical), they can provide the vehicle 300 with redundancy of systems and components (e.g., sensors, battery, inverter, motor, steering, braking, suspension, stability, HVAC, lighting, drive module controller, communication connections, etc.). Thus, if a system of one drive module or a component thereof fails or needs services, in many instances, the vehicle 300 will be able to continue to operate by relying on the corresponding system or component of the other drive module. In at least one example, if the vehicle 300 has multiple drive modules 312, individual drive modules 312 can be positioned on opposite ends of the vehicle 300 (e.g., the front and the rear, etc.).

In the illustrated example, the drive module(s) 312 include one or more sensor systems 328 to detect conditions of the drive module(s) 312 and/or the surroundings of the vehicle 300. By way of example and not limitation, the sensor system(s) 328 can include one or more wheel encoders (e.g., rotary encoders) to sense rotation of the wheels of the drive modules, inertial sensors (e.g., inertial measurement units, accelerometers, gyroscopes, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 312. In some cases, the sensor system(s) 328 on the drive modules can overlap or supplement corresponding systems of the vehicle 300 (e.g., sensor system(s) 304). For instance, when present, the LIDAR sensors on the drive module(s) 312 can be in addition to, and can supplement the fields of view of, the LIDAR sensors on the vehicle 300. Other sensors such as the inertial sensors of the drive module(s) 312 can measure the same or similar forces/conditions as the inertial sensors on the vehicle 300, but can measure them from the perspective of the drive module(s) 312. This can, for instance, enable to the drive module(s) 312 to operate and "balance" on their own, even when detached from the vehicle 300. In some examples, such sensor systems 338 can include, but are not limited to, mass airflow sensors, pressure sensors for wheels, battery charge capacity sensors, various microcontrollers capable of outputting diagnostic signals of associated systems or subsystems, and the like.

The drive module(s) 312 in this example include many of the vehicle systems, including a high voltage battery 330, a motor 332 (which can be an electric drive motor) to propel the vehicle, an inverter 334 to convert direct current from the battery into alternating current for use by other vehicle systems, a steering system 336 including a steering motor and steering rack (which can be electric), a brake system 338 including hydraulic or electric actuators, a suspension system 340 including hydraulic and/or pneumatic components, a stability control system 342 for distributing brake forces to mitigate loss of traction and maintain control, an HVAC system 344, lighting 346 (e.g., lighting such as head/tail lights to illuminate an exterior surrounding of the vehicle), and one or more other systems 348 (e.g., cooling system, safety systems, onboard charging system, other electrical components such as a DC/DC converter, a high voltage junction, a high voltage cable, charging system, charge port, etc.). In at least one example, the brake system 338 can correspond to the brake system 118 described above with reference to FIG. 1. Further, in at least one example, one or more of the systems described can comprise a power system 350, which can correspond to the power system, described above with reference to FIG. 1. For instance, in at least one example, the high voltage battery 330, the motor 332, etc. can be associated with the power system 350.

The drive module(s) 312 can also include a drive module controller 352 to receive and preprocess data from the sensor system(s) 328 and to control operation of the various vehicle systems 330-348. The drive module controller 352 includes one or more processors 354 and memory 356 communicatively coupled with the one or more processors 354. The memory 356 of the drive module(s) 312 can store a manifest 358 including a list or other data structure maintaining an inventory of the components that are included in the respective drive module. In some examples, such an inventory can include batch numbers for various parts, components, systems, or subsystems. In some examples, the manifest 358 can be generated and/or updated automatically by, for example, communication with the individual components/systems, or by sensing or reading one or more machine readable codes associated with the individual components/systems (e.g., by reading a radio frequency ID tag or barcode applied to each component/system). Additionally or alternatively, some components/systems can be added to the manifest manually by a technician when assembling or servicing the drive module(s) 312.

A diagnostics module 360 can execute on the drive module controller 352 to check systems of the respective drive module(s) 312 to ensure that they are operating within normal operating parameters. The diagnostics module 360 can employ data collected by sensor system(s) 328 of the drive module and/or data from the sensor system(s) 304 or vehicle computing device 302. Any failures or anomalies can be recorded in a fault log 362. The fault log 362 can include an indication of the failure or anomalous measurement detected and an identifier of the component(s)/system(s) involved. The fault log 362 can also store a snapshot of operating conditions leading up to the failure or anomalous measurement. The manifest 358 and the fault log 362 can be stored locally at the drive module(s) 312 and used by service technicians to troubleshoot problems when servicing the drive module(s) 312. Additionally or alternatively, the manifest 358 and/or fault log 362 can be reported to the vehicle computing device 302 (e.g., the force distribution module 326), an automated service robot, and/or to a remote service (e.g., a teleoperations computing device, an inventory tracking system, etc.). This reporting can occur periodically (e.g., daily, hourly, etc.) or upon the occurrence of certain events (e.g., determination of a fault, detection of a collision, transit to a service location, etc.). In some examples, the manifest 358 and/or fault log 362 (or a subset thereof) can be included in a vehicle heartbeat signal that is periodically transmitted to a remote fleet management system or teleoperations service.

The drive module(s) 312 also include one or more communication connection(s) 364 that enable communication by the respective drive module with one or more other local or remote computing devices. For instance, the communication connection(s) 364 can facilitate communication with other local computing devices on a respective drive module and/or the vehicle 300. Also, the communication connection(s) 364 can allow the drive module(s) 312 to communicate with other nearby computing devices (e.g., detached by proximate body module, an automated services vehicle, a remote-control device, etc.). For instance, the communication connection(s) 364 can enable to the drive module(s) 312 to communicate with other nearby components of the vehicle 300. The communication connection(s) 364 also enable the drive module(s) 312 to communicate with a remote teleoperations computing device or other remote services.

The communication connection(s) 364 include physical and/or logical interfaces for connecting the drive module controller 352 to another computing device or a network. For example, the communication connection(s) 364 can enable Wi-Fi-based communication such as via frequencies defined by the IEEE 802.11 standards, short range wireless frequencies such as Bluetooth®, or any suitable wired or wireless communications protocol that enables the respective computing device to interface with the other computing devices.

The processor(s) 314 of the vehicle 300 and the processor(s) 354 of the drive module(s) 312 can be any suitable processor capable of executing instructions to process data from the sensor system(s) 304 and 328, respectively, and control operation of the vehicle systems. By way of example and not limitation, the processor(s) 314 and 354 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 316 and memory 356 are examples of non-transitory computer-readable media. Memory 316 and memory 356 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Figure 4:
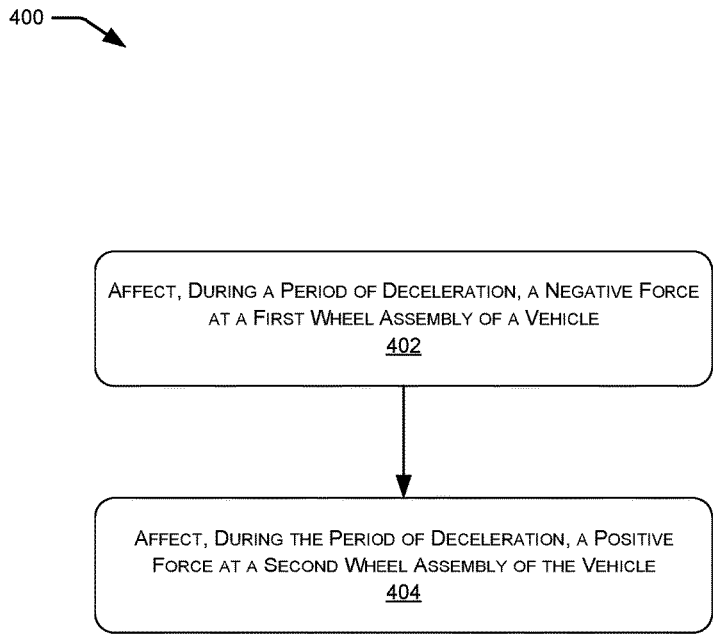
FIG. 4 is a flowchart illustrating an example method for implementing brake force distribution techniques described herein.
Figure 5:
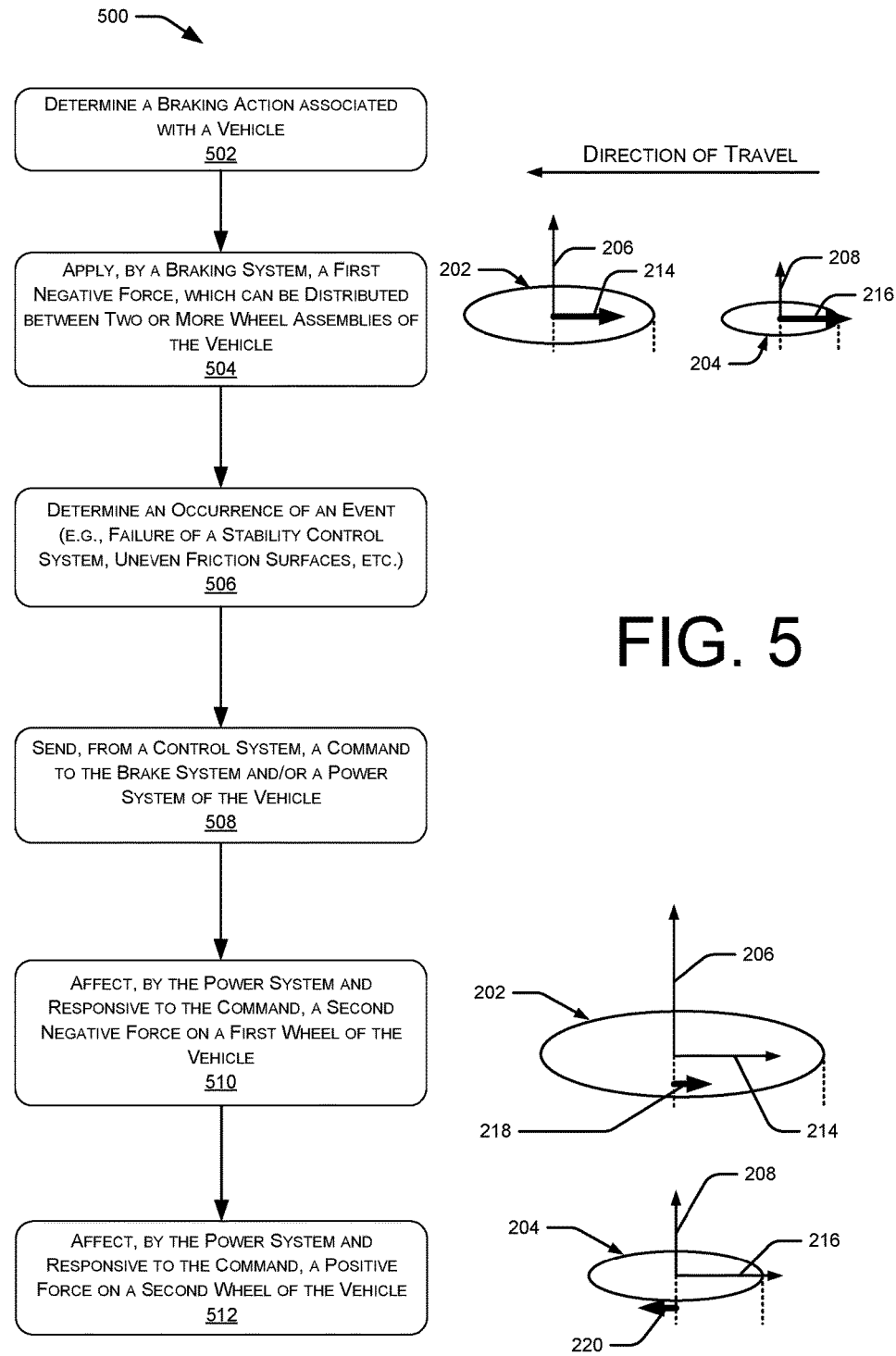
FIG. 5 is a flowchart illustrating another example method for implementing brake force distribution techniques described herein.
Figure 6:
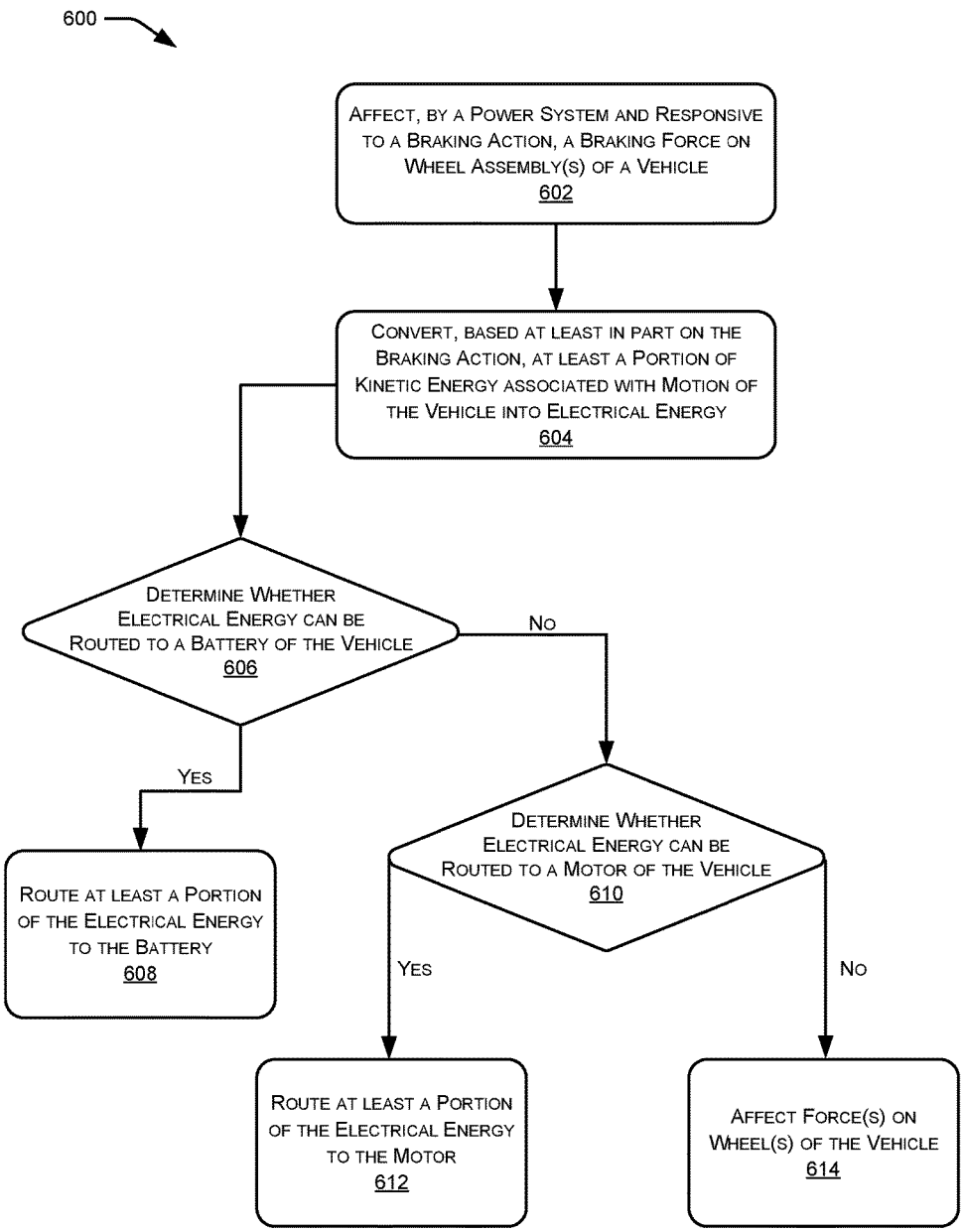
FIG. 6 is a flowchart illustrating additional details associated with an example method for implementing brake force distribution techniques described herein.

FIGS. 4-6 are flowcharts showing example methods involving the use of asymmetric braking techniques to apply force(s) to different wheel assemblies of a vehicle to vary the distribution of brake forces. The methods illustrated in FIGS. 4-6 are described with reference to the vehicle 300 shown in FIG. 3 for convenience and ease of understanding. However, the methods illustrated in FIGS. 4-6 are not limited to being performed using vehicle 300 shown in FIG. 3, and can be implemented using any of the other vehicles described in this application, as well as vehicles other than those described herein. Moreover, the vehicle 300 described herein is not limited to performing the methods illustrated in FIGS. 4-6.

FIG. 4 is a flowchart illustrating an example method 400 for implementing brake force distribution techniques described herein.

In at least one example, a control system (e.g., system controller(s) 324) can send a command to the brake system 338 and/or a power system 350 of the vehicle 300. In at least one example, the force distribution module 326 can provide an indication of how force(s) are to be distributed between different wheel assemblies of the vehicle 300 to vary the distribution of brake forces. That is, in at least one example, the force distribution module 326 can determine a magnitude and/or direction of force to be applied at each wheel assembly of the vehicle 300 and can provide an indication of such to the system controller(s) 324.

In at least one example, the system controller(s) 324 can send the command directly to the power system 350. In other examples, the system controller(s) 324 can send the command to the brake system 338, which can route the command to the power system 350. In additional and/or alternative examples, the system controller(s) 324 can send the command to both the power system 350 and the brake system 338.

At operation 402, the brake system 338 and/or the power system 350 can affect, during a period of deceleration, a negative force at a first wheel assembly of a vehicle. In at least one example, the brake system 338 can affect a negative force on one or more wheel assemblies responsive to receiving the command. That is, in such an example, the negative force can be distributed between the one or more wheel assemblies such to cause the vehicle 300 to decelerate. As such, the brake system 402 can affect a negative force at the first wheel assembly of the vehicle 300.

In additional and/or alternative examples, the power system 350 can affect a negative force at the first wheel assembly of the vehicle 300. As described above, the power system 350 can route power from one or more batteries 330 to a transmission of the vehicle 300 or can send power directly to motor(s) 334 proximate the wheel assemblies (e.g., front wheel assembly 108 and rear wheel assembly 110) or at each wheel of the vehicle 300 to cause the vehicle 300 to accelerate. In some examples, the power system 350 can utilize individual components of the power system 350 (e.g., the motor 332, which can be run in reverse as a generator) to affect negative force(s) on individual wheel(s) of the vehicle 300 (e.g., via regenerative braking techniques). In at least one example and responsive to receiving the command, the power system 350 can affect a negative force on a first wheel assembly of the vehicle 300.

At operation 404, the power system 350 can affect, during the period of deceleration, a positive force at a second wheel assembly of the vehicle. As described above, the power system 350 can route power from one or more batteries 330 to a transmission of the vehicle 300 or can send power directly to motor(s) 334 proximate the wheel assemblies (e.g., front wheel assembly 108 and rear wheel assembly 110) or at each wheel of the vehicle 300 to cause the vehicle 300 to accelerate. Accordingly, in some examples, the power system 350 can affect an accelerating force on a second wheel assembly of the vehicle 300 responsive to receiving the command.

Additionally and/or alternatively, the power system 350 can affect a positive force generated from regenerative braking techniques on the second wheel assembly of the vehicle 300 responsive to receiving the command. That is, in at least one example and responsive to receiving the command, the power system 350 can utilize at least some electrical energy resulting from affecting the negative braking force to affect a positive force on the rear wheel (via the rear wheel assembly 110) of the vehicle 300.

The application of such negative and positive forces can affect an asymmetric brake force distribution during a period of deceleration, which can mitigate wheel-lock, as described above.

In at least one example, the positive force that is applied to the rear wheel by the power system 350 can be less than or equal to the negative force that is applied to the front wheel. In some examples, energy can be lost in the system due to one or more transfers of energy, thereby reducing the magnitude of the positive force. In additional and/or alternative examples, as described below with respect to FIG. 5, energy can be routed to additional and/or alternative systems of the vehicle 300, thereby reducing the magnitude of the positive force.

As noted above, while the first wheel assembly can correspond to a front wheel assembly and the second wheel assembly can correspond to a rear wheel assembly, in some examples, techniques described herein can be utilized to vary brake forces between left wheel(s) and right wheel(s) and/or wheels that are diagonally positioned. That is, in some examples, the negative force can be affected on a wheel on a left side of the vehicle 300 and an equal, but opposite (positive) force can be affected on a wheel on a right side of the vehicle 300. In some examples, the left wheel and the right wheel can be positioned on a same end of the vehicle 300 (e.g., the front or rear) or on different ends of the vehicle 300. In some examples, such brake force distribution can be implemented in vehicles having multi-wheel independent braking capabilities (e.g., having HUB motors).

FIG. 5 is a flowchart illustrating an example method 500 for implementing brake force distribution techniques described herein.

At operation 502, a brake system 338 can determine a braking action associated with a vehicle 300. The vehicle 300 can include a main brake actuator (e.g., main brake actuator 120), which can be actuated by a computing device of the vehicle 300 (e.g., system controller(s) 324) or by a manual input (e.g., by a driver or passenger). The brake system 338 can determine the braking action responsive to actuation of the main brake actuator.

At operation 504, the brake system 338, can apply a first negative force which can be distributed between two or more wheel assemblies of the vehicle 300. Responsive to determining the brake action, the brake system 338 can apply a clamping force to a brake rotor or drum associated with a brake assembly of a wheel assembly to cause the vehicle 300 to decelerate. As described above, in bidirectional vehicles (and unidirectional vehicles so designed), the sizing of vehicle components can be substantially the same for both (or all) wheel assemblies. That is, in bidirectional vehicles, there can be hardware symmetry (at least in terms of performance) to facilitate the bidirectional functionality of the vehicle 300. Accordingly, in some examples and responsive to a braking action, an equal amount of negative force can be applied at each wheel assembly. In other examples, responsive to a braking action, an unequal amount of negative force can be applied at each wheel assembly depending on how the first negative force is distributed between the wheel assemblies.

The friction circles 202 and 204 are depicted next to operation 404. As described above, as brake force is applied via the brake system 338 of the vehicle 300, the weight of the vehicle 300 shifts forward. Arrows 206 and 208 represent the wheel assembly loads in each friction circle 202 and 204, respectively. In view of the direction of travel, the wheel assembly load on a front wheel assembly (e.g., front wheel assembly 108) has a larger magnitude than the wheel assembly load on a rear wheel assembly (e.g., rear wheel assembly 110), as shown by arrow 206 being longer than arrow 208. As described above, due to the sizing of vehicle components being substantially the same for both (or all) wheel assemblies (e.g., the front wheel assembly 108 and the rear wheel assembly 110) of a bidirectional vehicle, an equal amount of negative force can be applied at the front wheel assembly and the rear wheel assembly, as shown by arrows 214 and 216, which are of equal length. Accordingly, the brake system 338 described above can apply negative forces of equal magnitude to each of the wheel assemblies (e.g., the front wheel assembly 108 and the rear wheel assembly 110).

It should be noted that while the example described above, is directed to the brake system 338 applying a brake force that can be distributed across two or more wheel assemblies of the vehicle 300, in additional and/or alternative examples, alternative systems can cause an unequal distribution of brake force between the two or more wheel assemblies. For instance, the ESC, etc., when functioning properly, can intentionally apply different forces at different wheel assemblies. Furthermore, in the absence of a force distribution system, operation 506, below, can be omitted, and operations 504, 508, and 510 can be performed substantially simultaneously.

At operation 506, a force distribution module 326 can determine an occurrence of an event (e.g., failure of a stability control system, uneven friction surfaces, etc.). As described above, the force distribution module 326 can determine when to apply different force(s) to different wheels (e.g., via different wheel assemblies) of the vehicle 300 to vary the distribution of brake forces. In at least one example, the force distribution module 326 can determine an occurrence of an event.

In some examples, the force distribution module 326 can receive information from one or more vehicle components (e.g., a drive module controller 352) and can determine a failure of a stability control system 342. For instance, in such examples, a drive module controller 352, can send an indication of a fault associated with a stability control system 342 to the force distribution module 326. Responsive to receiving the indication from the drive module controller 352, the force distribution module 326 can determine an occurrence of an event.

In an additional and/or alternative example, the force distribution module 326 can access data associated with wheel speeds of individual wheels of the vehicle 300. Based on the data associated with the wheel speeds, the force distribution module 326 can calculate a relative slip of each of the wheels. Leveraging the determined slip of individual of the wheels, the force distribution module 326 can determine variations of friction with respect to the surface on which the vehicle 300 is driving. That is, in some examples, a first wheel can be associated with a first wheel speed that is greater than a second wheel speed associated with a second wheel. In such examples, the first wheel can be on a surface having less friction (e.g., a lower friction coefficient) than a surface that the second wheel is on. Additionally and/or alternatively, individual wheels can have different wear, pressure, etc. which can cause the first wheel to be associated with the first wheel speed that is greater than the second wheel speed associated with the second wheel. Based at least in part on determining a variation in friction with respect to the surface on which the vehicle 300 is driving, or other inconsistencies with respect to friction, the force distribution module 326 can determine an occurrence of an event. In at least one example, the force distribution module 326 can refrain from determining an occurrence of an event until a difference between two or more friction coefficients is greater than a threshold. In such an example, responsive to the difference in friction between two or more surfaces meeting or exceeding a threshold, the force distribution module 326 can determine an occurrence of an event.

In some examples, the force distribution module 326 can receive an instruction (e.g., responsive to input from a driver, passenger, remote operator, etc.) indicating an occurrence of an event.

While operation 506 is directed to determining an occurrence of an event, in alternative examples, operations 508 and 510 can be performed at any time without an event taking place.

At operation 508, a control system (e.g., system controller(s) 324) can send a command to the brake system 338 and/or a power system 350 of the vehicle 300. Based at least in part on determining an occurrence of an event, the force distribution module 326 can send an indication of the event to the system controller(s) 324, which can send command(s) to one or more system(s) of the drive module(s) 312. In at least one example, the force distribution module 326 can provide an indication of how force(s) are to be distributed between different wheel assemblies of the vehicle 300 to vary the distribution of brake forces. That is, in at least one example, the force distribution module 326 can determine a magnitude and/or direction of force to be applied at each wheel assembly of the vehicle 300 and can provide an indication of such to the system controller(s) 324.

In at least one example, the system controller(s) 324 can send the command directly to the power system 350. In other examples, the system controller(s) 324 can send the command to the brake system 338, which can route the command to the power system 350. In additional and/or alternative examples, the system controller(s) 324 can send the command to both the power system 350 and the brake system 338.

At operation 510, the power system 350 can affect a second negative force on a first wheel of the vehicle 300. As described above, the power system 350 can route power from one or more batteries 330 to a transmission of the vehicle 300 or can send power directly to motor(s) 334 proximate the wheel assemblies (e.g., front wheel assembly 108 and rear wheel assembly 110) or at each wheel of the vehicle 300 to cause the vehicle 300 to accelerate. In some examples, the power system 350 can utilize individual components of the power system 350 (e.g., the motor 332, which can be run in reverse as a generator) to affect negative force(s) on individual wheel(s) of the vehicle 300 (e.g., via regenerative braking techniques).

In at least one example and responsive to receiving the command, the power system 350 can affect an additional negative force on the front wheel (via the front wheel assembly 108) of the vehicle 300. That is, in at least one example, the power system 350 can utilize regenerative braking techniques to affect an additional negative force on the front wheel of the vehicle 300. Accordingly, the power system 350 can leverage regenerative braking to affect an additional negative force 218 (i.e., in addition to a negative force, represented by arrow 214, applied by the mechanical brakes) on the front wheel, as illustrated in the friction circle 202 that is shown next to operation 410. In some examples, such regenerative braking force 218 may be selected to optimize the force with respect to the friction circle associated with the front wheel. At least a portion of energy derived from such regenerative braking techniques may be used in operation 512, as described in detail below. Furthermore, as described below, if other components of the vehicle 300 are capable of receiving electric energy, some electric energy can be deposited with those components instead of being used at operation 512, as described below with reference to FIG. 6.

At operation 512, the power system 350 can affect a positive force on a second wheel of the vehicle 300. In at least one example and responsive to receiving the command, the power system 350 can utilize at least some electrical energy resulting from affecting the negative braking force to affect a positive force on the rear wheel (via the rear wheel assembly 110) of the vehicle 300. That is, the power system 350 can leverage regenerative braking to affect a positive force 220 that is approximately equal in magnitude to the additional negative force 218 on the rear wheel, as illustrated in the friction circle 204 that is shown next to operation 512.

In this manner, the braking force applied at the front wheel assembly 108 via the mechanical brakes (e.g., via the brake system 328) is supplemented with regenerative braking from the power system 350, and the braking force applied at the rear wheel assembly 110 by the mechanical brakes (e.g., via the brake system 328) is reduced by a positive force from the power system 350. This relationship can be shown in Equations 1-3, above. As a result of supplementing mechanical braking with regenerative braking, the brake force distribution between the front wheel assembly 108 and the rear wheel assembly 110 can be apportioned such that the total amount of braking force applied to the front wheel is greater than the total amount of braking force applied to the rear wheel. Accordingly, responsive to a braking action, the rear wheel can continue to roll (e.g., maintain a rotational velocity) and rear-wheel lock-up can be prevented. In some examples, such a difference between brake forces may be calculated to optimize braking to be within a friction circle.

In at least one example, the positive force that is applied to the rear wheel by the power system 350 can be less than or equal to the negative force that is applied to the front wheel. In some examples, energy can be lost in the system due to one or more transfers of energy, thereby reducing the magnitude of the positive force. In additional and/or alternative examples, as described below with respect to FIG. 6, energy can be routed to additional and/or alternative systems of the vehicle 300, thereby reducing the magnitude of the positive force. In some examples, as described above with respect to FIG. 4, the positive force 220 can be generated based on power from the poser system 350 without the use of regenerative braking. That is, in some examples, operation 510 can be optional. In such examples (e.g., where no regenerative braking is used in the front wheel assembly), the positive force 220 may nonetheless be generated based on power from the power system 350 to yield a net force on the rear wheel smaller in magnitude than as applied on the front wheel.

As noted above, while FIG. 5 is described with respect to applying different forces to front wheel(s) and rear wheel(s), in some examples, techniques described herein can be utilized to vary brake forces between left wheel(s) and right wheel(s) and/or wheels that are diagonally positioned. That is, in some examples, the power system 350 can affect a negative force on a wheel on a left side of the vehicle 300 and an equal, but opposite (positive) force on a wheel on a right side of the vehicle 300. In some examples, the left wheel and the right wheel can be positioned on a same end of the vehicle 300 (e.g., the front or rear) or on different ends of the vehicle 300. In some examples, such brake force distribution can be implemented in vehicles having multi-wheel independent braking capabilities (e.g., having HUB motors).

FIG. 6 is a flowchart illustrating additional details associated with an example method 600 for implementing brake force distribution techniques described herein.

At operation 602, responsive to a braking action, a power system 350 can affect a braking force on wheel assembly(s) of a vehicle 300. As described above, the vehicle 300 can include a main brake actuator (e.g., main brake actuator 120), which can be actuated by a computing device of the vehicle 300 (e.g., system controller(s) 324) or by a manual input (e.g., by a driver or passenger). In at least one example, a brake system 338 can determine the braking action responsive to actuation of the service brake and can send an indication of the braking action to the power system 350. In other examples, the system controller(s) 324 can send an indication of the braking action directly to the power system 350. In at least one example, responsive to the braking action, the power system 350 can affect a braking force on wheel assembly(s) of the vehicle 300. In at least one example, the power system 350 can cause the motor 332 to run in a reverse direction to cause the vehicle 300 to slow down (e.g., to operate as regenerative braking). As a result of the motor 332 running in the reverse direction, the power system 350 can affect a negative braking force on one or more wheels of the vehicle 300. In at least one example, the system controller(s) 324 can send the indication of the braking action responsive to an event, as described above.

At operation 604, a power system 350 of the vehicle 300 can convert, based at least in part on the braking action, at least a portion of kinetic energy associated with motion of the vehicle 300 into electrical energy. In at least one example, the motor 332 can be run in reverse (e.g., as a generator) to convert kinetic energy into electrical energy. In some examples, the electrical energy generated can be routed to one or more systems of the vehicle 300 for immediate use or storage for future use.

At operation 606, the power system 350 can determine whether electrical energy can be routed to a battery 330 of the vehicle 300. In at least one example, the power system 350 can determine whether the battery 330 is capable of taking any of the electrical energy generated by the braking force(s). In some examples, the battery 330 can be fully charged, stressed, hot, cold, etc. such that the battery 330 cannot take all (or, in some cases, any) of the electrical energy generated. Based at least in part on determining that at least some electrical energy can be routed to the battery 330 of the vehicle 300, the power system 350 can route at least some electrical energy to the battery 330, as shown at operation 608. That is, based at least in part on determining that the battery 330 is capable of receiving at least some of the electrical energy generated, the power system 350 can route that electrical energy to the battery 330.

In additional and/or alternative examples, the operation 608 can include routing at least a portion of the electrical energy generated via regenerative braking to one or more power sinks in general, and is not limited to the battery 330. For example, at least a portion of the electrical energy can be routed to one or more of a capacitor, flywheel, or other energy storage system.

Based at least in part on determining that at least some electrical energy cannot be routed to the battery 330 of the vehicle 300, the power system 350 can determine whether electrical energy can be routed to a motor 332 of the vehicle 300, as shown at operation 610. In at least one example, the power system 350 can determine whether the motor 332 is capable of taking any of the electrical energy generated by the braking force(s). In some examples, the motor 332 may not be capable of taking the electrical energy due to a limitation (e.g., a malfunction of a cooling system, exceeding a maximum torque, etc.). Based at least in part on determining that at least some electrical energy can be routed to the motor 332 of the vehicle 300, the power system 350 can route at least some electrical energy to the motor 332, as shown at operation 612. Based at least in part on determining that the motor 332 is capable of receiving at least some of the electrical energy generated, the power system 350 can route that electrical energy to the motor 332.

Based at least in part on determining that at least some electrical energy cannot be routed to the motor 332 of the vehicle 300, the power system 350 can utilize at least some electrical energy (the electrical energy that cannot be deposited in the motor 332) to affect force(s) on wheels(s) of the vehicle 300, as shown at operation 614. In at least one example, the power system 350 can utilize the electrical energy for affecting a positive force on one or more wheels of the vehicle 300. In such an example, the power system 350 can utilize the electrical energy to apply a positive force to one or more wheel assemblies of the vehicle 300. In some examples, the positive force can be equal to the negative braking force applied by the power system 350 (e.g., if the battery 330 and the motor 332 are not capable of taking any electrical energy and/or assuming no loss of energy via energy transfer). In other examples, the positive force can be less than the negative braking force applied by the power system 350 (e.g., if the battery 330 and/or the motor 332 are capable of taking at least some electrical energy and/or assuming no loss of energy via energy transfer). In at least one example, the magnitude of the force(s) affected on the wheel(s) of the vehicle 300 can be optimized based on friction circle(s) associated with the wheel(s), as described above.

The methods 400-600 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 400-600 can be combined in whole or in part with each other or with other methods.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

EXAMPLE CLAUSES

A. A vehicle operable to travel in at least a first direction, the vehicle comprising: two or more wheel assemblies; a power system operable to provide power to enable the vehicle to accelerate; a brake system operable to cause, responsive to a braking action, a first negative force to be distributed between the two or more wheel assemblies to cause the vehicle to decelerate; and a control system including: one or more processors; and one or more instructions executable by the one or more processors to send a command, responsive to the braking action, to at least one of the power system or the brake system to: cause the power system to affect a second negative force on a first wheel assembly of the two or more wheel assemblies at a first time; and cause the power system to affect a positive force on a second wheel assembly of the two or more wheel assemblies at a second time that is substantially a same time as the first time, wherein an application of the second negative force and the positive force generates a brake force distribution such that a first total amount of braking force applied at the first wheel assembly is greater than a second total amount of braking force applied at the second wheel assembly.

B. The vehicle paragraph A recites, wherein the first wheel assembly is a front wheel assembly and the second wheel assembly is a rear wheel assembly, relative to the first direction of travel, and the front wheel assembly is associated with an opposite end of the vehicle than the rear wheel assembly.

C. The vehicle as either paragraph A or B recites, wherein the power system is further operable to, responsive to the braking action, convert kinetic energy associated with a motion of the vehicle into electrical energy and generate the positive force using at least a first portion of the electrical energy.

D. The vehicle as paragraph C recites, wherein the power system is further operable to: determine a state of a battery associated with the power system; and route, based at least in part on the state of the battery, a second portion of the electrical energy into the battery.

E. The vehicle as any of paragraphs A-D recite, wherein the one or more instructions are executable by the one or more processors further to: determine that a first friction coefficient associated with a first wheel of the first wheel assembly differs from a second friction coefficient associated with a second wheel of the second wheel assembly; and send the command responsive to determining that the first friction coefficient differs from the second friction coefficient.

F. The vehicle as any of paragraphs A-E recite, wherein a first magnitude of the second negative force is substantially equal to a second magnitude of the positive force.

G. The vehicle as any of paragraphs A-F recite, wherein the one or more instructions are executable by the one or more processors further to: determine a friction circle associated with the first wheel assembly, the friction circle defining a maximum magnitude of negative force based at least in part on a direction of travel of the vehicle; and determining a magnitude of the second negative force based at least in part on the maximum magnitude of negative force.

H. The vehicle as any of paragraphs A-G recite, wherein the first wheel assembly and the second wheel assembly have substantially symmetric hardware.

I. A computer-implemented method performed by one or more systems of a vehicle, the computer-implemented method comprising: responsive to a braking action, causing, by a brake system of the one or more systems, a first negative force to be distributed across at least two wheel assemblies of a vehicle; and sending a command to a power system of the one or more systems, the command instructing the power system to: affect a second negative force on a first wheel assembly of the at least two wheel assemblies so that a first total amount of braking force applied at the first wheel assembly corresponds to a first sum of a first portion of the first negative force and the second negative force; and affect a positive force on a second wheel assembly of the at least two wheel assemblies so that a second total amount of braking force applied at the second wheel assembly corresponds to a second sum of a second portion of the first negative force and the positive force, the positive force being applied in a same direction as the vehicle is travelling.

J. The computer-implemented method as paragraph I recites, wherein the first wheel assembly is a front wheel assembly and the second wheel assembly is a rear wheel assembly, relative to a direction in which the vehicle is travelling, and the front wheel assembly is associated with an opposite end of the vehicle than the rear wheel assembly.

K. The computer-implemented method as paragraph I or J recites, further comprising: determining a friction circle associated with the first wheel assembly; and determining a first magnitude of the second negative force and a second magnitude of the positive force based at least in part on the friction circle associated with the first wheel assembly.

L. The computer-implemented method as any of paragraphs I-K recite, wherein a first magnitude of the second negative force and a second magnitude of the positive force are equal.

M. The computer-implemented method as any of paragraphs I-L recite, wherein a first magnitude of the second negative force and a second magnitude of the positive force are unequal.

N. The computer-implemented method as any of paragraphs I-M recite, wherein affecting the second negative force includes converting at least a portion of kinetic energy associated with motion of the vehicle into electrical energy.

O. The computer-implemented method as paragraph N recites, further comprising: determining a state of a battery coupled to the power system; determining, based at least in part on the state of the battery, at least a portion of the electrical energy to utilize for the positive force; and utilizing at least the portion of the electrical energy to affect the positive force.

P. A non-transitory computer-readable medium having a set of instructions that, when executed, cause one or more processors to perform operations comprising, during a period of deceleration, sending a command to at least a power system of a vehicle to cause the power system to affect a negative force on a first wheel assembly of the vehicle and a positive force on a second wheel assembly of the vehicle to cause an uneven distribution of brake force between the first wheel assembly and the second wheel assembly.

Q. The non-transitory computer-readable medium as paragraph P recites, the operations further comprising sending the command responsive to an occurrence of an event, wherein the event comprises at least one of: a receipt of a braking signal; a failure of a stability control system; or a difference between a first friction coefficient associated with a first surface on which the first wheel assembly is located and a second friction coefficient associated with a second surface on which the second wheel assembly is located meets or exceeds a threshold.

R. The non-transitory computer-readable medium paragraph P or Q recites, wherein the first wheel assembly is a front wheel assembly and the second wheel assembly is a rear wheel assembly, relative to a direction in which the vehicle is travelling, and the front wheel assembly is on an opposite end of the vehicle than the rear wheel assembly.

S. The non-transitory computer-readable medium as any of paragraphs P-R recite, wherein the magnitude of the second negative force is greater than or equal to the magnitude of the positive force.

T. The non-transitory computer-readable medium as any of paragraphs P-S recite, the operations further comprising: determining a state of a component of the power system that is configured to receive electrical energy; and determining a magnitude of the positive force based at least in part on the state of the component.

While paragraphs A-H are described above with respect to a system, it is understood in the context of this document that the content of paragraphs A-H may also be implemented via a method, device, and/or computer storage media. While paragraphs I-O are described above with respect to a method, it is understood in the context of this document that the content of paragraphs I-O may also be implemented via a system, device, and/or computer storage media. While paragraphs P-T are described above with respect to a non-transitory computer-readable medium, it is understood in the context of this document that the content of paragraphs P-T may also be implemented via a method, device, and/or system.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A computer-implemented method comprising:
    causing, by a brake system of a vehicle, a first force to be applied to a first wheel of the vehicle and a second force to be applied to a second wheel of the vehicle, wherein the first force and the second force are applied in a first direction that is opposite a second direction in which the vehicle is travelling; and
    sending, by a control system of the vehicle, a command instructing a power system of the vehicle to affect a third force on the first wheel, wherein the third force is applied in the second direction.

2. The computer-implemented method of claim 1, wherein the command further instructs the power system to affect a fourth force on the second wheel, wherein the fourth force is applied in the first direction.

3. The computer-implemented method of claim 2, wherein a magnitude of the fourth force is based at least in part on one or more of the first force, the second force, the third force, or a weight of the vehicle.

4. The computer-implemented method of claim 1, wherein the first force and the second force are applied responsive to a braking action and the command is sent responsive to the braking action, and
    wherein the first force and the second force have substantially similar magnitudes.

5. The computer-implemented method of claim 4, wherein the power system is further operable to, responsive to the braking action, convert kinetic energy associated with a motion of the vehicle into electrical energy and generate the third force using at least a first portion of the electrical energy.

6. The computer-implemented method of claim 5, further comprising:
    determining a state of a battery associated with the power system; and
    routing, based at least in part on the state of the battery, a second portion of the electrical energy into the battery.

7. The computer-implemented method of claim 1, further comprising:
    determining that a first friction coefficient associated with the first wheel differs from a second friction coefficient associated with the second wheel; and
    sending the command responsive to determining that the first friction coefficient differs from the second friction coefficient.

8. A system comprising:
    one or more processors; and
    one or more instructions executable by the one or more processors to perform operations comprising:
        causing, by a brake system of a vehicle, a first force to be applied to a first wheel of the vehicle and a second force to be applied to a second wheel of the vehicle, wherein the first force and the second force are applied in a first direction that is opposite a second direction in which the vehicle is travelling; and
        sending, by a control system of the vehicle, a command instructing a power system of the vehicle to affect a third force on the first wheel, wherein the third force is applied in the second direction.

9. The system of claim 8, wherein the command further instructs the power system to affect a fourth force on the second wheel, wherein the fourth force is applied in the first direction.

10. The system of claim 9, the operations further comprising:
    determining a maximum magnitude of force that can be applied in the first direction based at least in part on the second direction in which the vehicle is travelling; and
    determining a magnitude of the third force and a magnitude of the fourth force based at least in part on the maximum magnitude of force that can be applied in the first direction.

11. The system of claim 8, wherein the first force and the second force have substantially similar magnitudes, and
    wherein the first force and the second force are applied responsive to a braking action and the command is sent responsive to the braking action.

12. The system of claim 11, wherein the power system is further operable to, responsive to the braking action, convert kinetic energy associated with a motion of the vehicle into electrical energy and generate the third force using at least a first portion of the electrical energy.

13. The system of claim 12, the operations further comprising:
    determining a state of a battery associated with the power system; and
    routing, based at least in part on the state of the battery, a second portion of the electrical energy into the battery.

14. The system of claim 8, the operations further comprising:
    determining that a first friction coefficient associated with the first wheel differs from a second friction coefficient associated with the second wheel; and
    sending the command responsive to determining that the first friction coefficient differs from the second friction coefficient.

15. A non-transitory computer-readable medium having a set of instructions that, when executed, cause one or more processors to perform operations comprising:
- causing, by a brake system of a vehicle, a first force to be applied to a first wheel of the vehicle and a second force to be applied to a second wheel of the vehicle, wherein the first force and the second force are applied in a first direction that is opposite a second direction in which the vehicle is travelling; and
- sending a command instructing a power system to affect a third force on the first wheel, wherein the third force is applied in the second direction.

16. The non-transitory computer-readable medium of claim 15, wherein the command further instructs the power system to affect a fourth force on the second wheel, wherein the fourth force is applied in the first direction.

17. The non-transitory computer-readable medium of claim 16, wherein the fourth force is based at least in part on one or more of the first force, the second force, the third force, or a weight of the vehicle.

18. The non-transitory computer-readable medium of claim 15, wherein:
- the first force and the second force have a substantially equal magnitude;
- the first force and the second force are applied responsive to a braking action and the command is sent responsive to the braking action; and
- the power system is further operable to, responsive to the braking action, convert kinetic energy associated with a motion of the vehicle into electrical energy and generate the third force using at least a first portion of the electrical energy.

19. The non-transitory computer-readable medium of claim 18, further comprising:
- determining a state of a battery associated with the power system; and
- routing, based at least in part on the state of the battery, a second portion of the electrical energy into the battery.

20. The non-transitory computer-readable medium of claim 15, further comprising:
- determining that a first friction coefficient associated with the first wheel differs from a second friction coefficient associated with the second wheel; and
- sending the command responsive to determining that the first friction coefficient differs from the second friction coefficient.

* * * * *